W. G. NEWTON.
MIXING VALVE.
APPLICATION FILED DEC. 11, 1912.
1,071,454.
Patented Aug. 26, 1913.
3 SHEETS—SHEET 1.
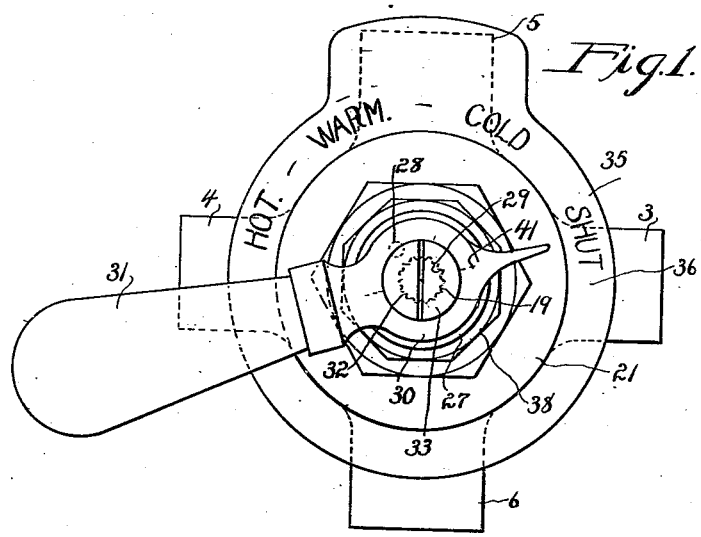
Fig. 1.
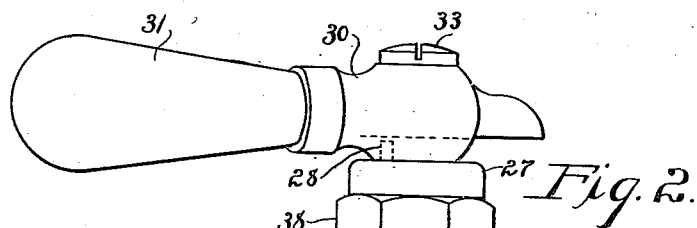
Fig. 2.
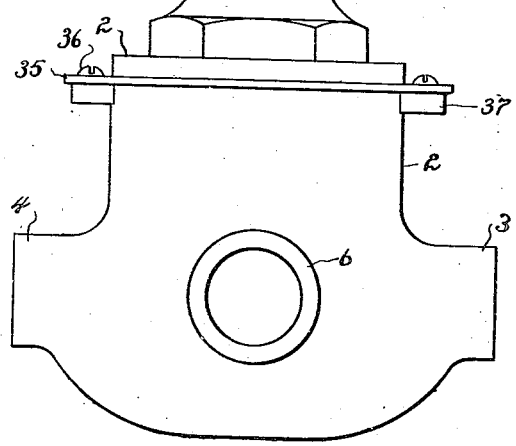
Witnesses
M. P. Nichols
C. L. Weed
Inventor
William G. Newton
by Seymour Pearce
Atty.

W. G. NEWTON.
MIXING VALVE.
APPLICATION FILED DEC. 11, 1912.
1,071,454.
Patented Aug. 26, 1913.
3 SHEETS—SHEET 2.
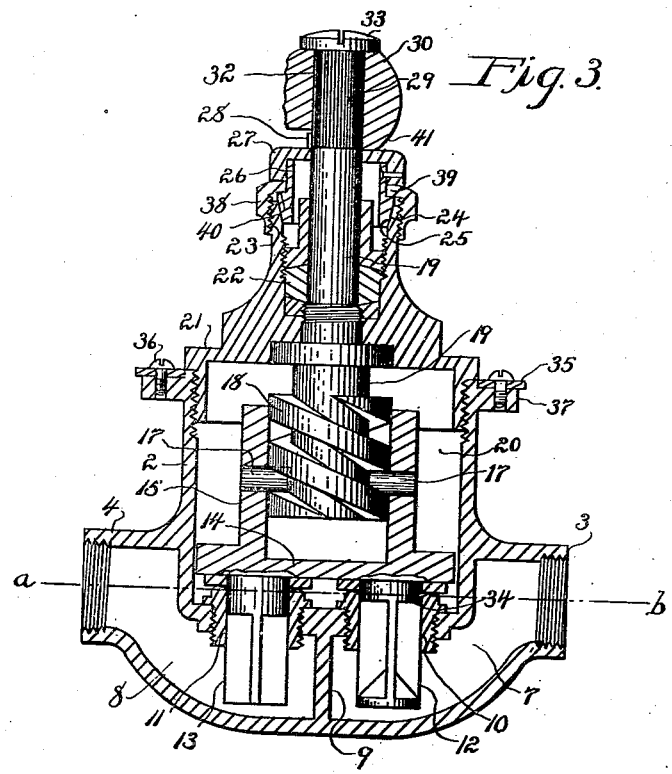
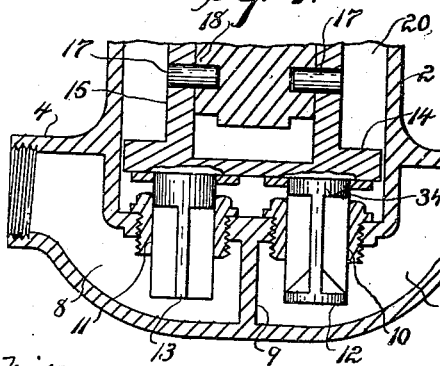
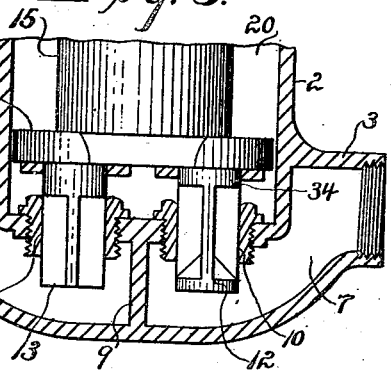

W. G. NEWTON.
MIXING VALVE.
APPLICATION FILED DEC. 11, 1912.
1,071,454.
Patented Aug. 26, 1913.
3 SHEETS—SHEET 3.
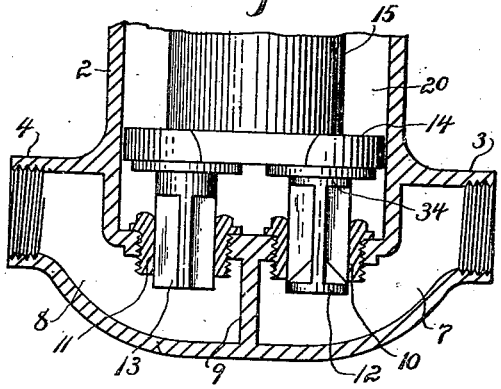
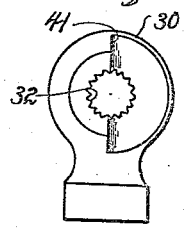
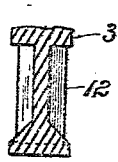
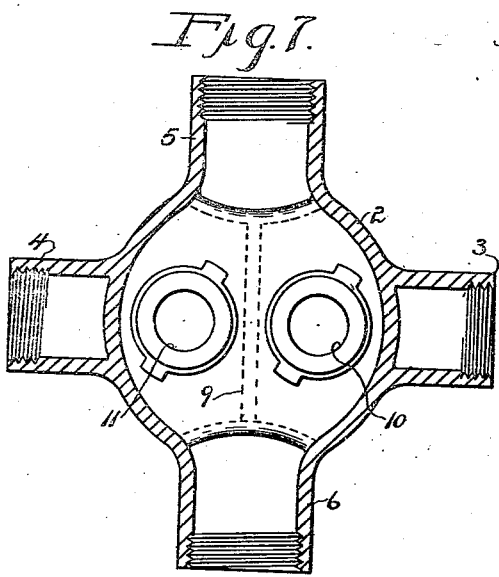
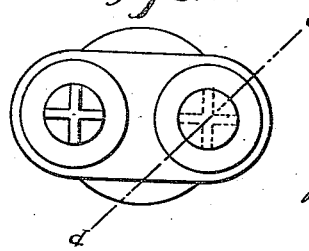

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

MIXING-VALVE.

1,071,454.  Specification of Letters Patent.  Patented Aug. 26, 1913.

Application filed December 11, 1912. Serial No. 736,177.

*To all whom it may concern:*

Be it known that I, WILLIAM G. NEWTON, a citizen of the United States, residing at New Haven, in the county of New Haven and State of Connecticut, have invented a new and useful Improvement in Mixing-Valves; and I do hereby declare the following, when taken in connection with the accompanying drawings and the characters of reference marked thereon, to be a full, clear, and exact description of the same, and which said drawings constitute part of this application, and represent, in—

Figure 1 a top or plan view of a mixing valve constructed in accordance with my invention. Fig. 2 a side view of the same. Fig. 3 a view in vertical section. Fig. 4 a sectional view showing the valve partly open for the passage of cold water. Fig. 5 shows the valve still further open for the discharge of warm water. Fig. 6 a similar view showing the valve open for the discharge of hot water. Fig. 7 a sectional view on the line *a—b* of Fig. 3. Fig. 8 an underside view of the yoke with two of the valves carried thereby. Fig. 9 a broken sectional view on the line *c—d* of Fig. 8. Fig. 10 a broken underside view of the hub end of the operating handle.

This invention relates to an improvement in mixing valves, and particularly to valves by which provision is made for limiting the discharge of hot water with relation to cold. In hotels and other places where hot and cold water are provided, provision must be made to so temper the hot water that the person using it will not be scalded. It is apparent that the nearer the boiler the hotter the water, and consequently the more cold will be required to temper it. These valves are usually provided with an indicating handle and provision is made for limiting the movement of the valve. The object of this invention is a simple arrangement of parts whereby the limit for the opening of the valve may be set, and when set is not likely to be tampered with; and the invention consists in the construction and combination of parts hereinafter described and particularly recited in the claims.

In carrying out my invention, I employ a valve body 2 having a cold water inlet 3 at one side and a hot water inlet 4 at the opposite side, and with the usual outlets 5 and 6. The cold water inlet chamber 7 is separated from the hot water inlet 8 by a wall 9, and opening from the chamber 7 is a port 10, and opening from the chamber 8 is a port 11. These are controlled respectively by valves 12 and 13 extending downward from a yoke 14 having a socket 15 provided with inwardly projecting pins 17 with which threads 18 on the valve stem 19 engage. In lieu of the socket provided with pins, a socket provided with interior screw threads for engagement with the screw threads 18 might be provided. The upper portion of the casing in which the yoke stands I term a mixing chamber 20 the open upper end of which is closed by a bonnet 21 containing a stuffing box 22 through which the valve stem 19 extends. The upper end of the bonnet is provided with external threads 23, and the inner wall at the outer end has a bevel 24 to receive the beveled lower end 25 of a ring 26 which is firmly connected at its outer end with a cap 27 which carries on its upper face a stud or pin 28. Surrounding the upper end of the bonnet and engaging with the threads 23 is a clamping collar 38 having an inwardly extending flange 39 which engages with a shoulder 40 on the ring and so that by turning the clamping collar onto the bonnet the ring will be crowded into the upper end of the bonnet and be frictionally held against turning. In this way the stop pin 28 is located at the desired point. The upper end of the stem 19 is formed with a series of beveled ribs 29 over which the hub 30 of the operating handle 31 extends, the inner surface of this hub being provided with depressions formed by the ribs 32 corresponding to the ribs 29 on the stem so that the handle may be locked with the stem at various points of adjustment. The hub is prevented from lifting away from the stem by a set screw 33. The inner face of the hub is provided with a shoulder 41 which is in position to engage with the stop pin 28. As usual in valves of this construction the valve 12 closing the port 10 is of web-like character, but the upper end 34 has a cylindrical portion which closely fits the port 10 and is adapted at its lower end to also close the port. While the valve 13 has a cylindrical portion made longer than that of the valve 12 so that the port 11 will not be opened until after the port 10 has been opened to a certain degree and will remain open when the port 10 is closed by the lower end of the valve 12. Surrounding the upper end of the casing is a dial 35 which is secured in place by screws 36 extending into lugs 37 projecting outward from opposite sides of the casing.

To adjust the valve, the clamping collar will be loosened so that the ring with its cap may be freely turned. Water of maximum heat being ready for delivery, the operating handle is turned to open the hot water valve 13 to the desired extent. In thus opening the valve the shoulder 41 engages with the stop pin 28 and hence moves the cap and ring with it; and when a sufficient degree of hot water is obtained the clamping collar 38 will be turned down so as to crowd the ring into the bonnet and lock it against rotation. The stop pin is thus located so as to prevent the turning of the handle beyond a fixed point, and so that the extent to which the hot water valve may be raised is determined. If at any time conditions change or the valve is used in another place, it is only necessary to loosen the clamping collar and adjust the ring and cap so that the pin 28 will stand in proper position to arrest the movement of the operating handle. The means for locking the ring will not be readily understood by anyone not familiar with it so that the valve will not be tampered with by unofficial persons. In first opening the valve the port 10 opens first so that cold water may be discharged. Further opening of the valve will gradually open the hot water so that the mixture of hot and cold or warm water will be discharged. The continued movement of the valve will increase the opening for the hot water and gradually close the port for cold water so that hot water will be discharged, the temperature of the hot water being regulated by the amount of cold water admitted with it. The purpose of the valve as before stated, is to prevent water of a very high degree being discharged.

I claim:—

1. In a mixing valve, the combination with a casing having inlet chambers, a mixing and outlet chamber connected with the inlet chambers by ports, valves adapted to open and close said ports, said valves carried by a valve stem, a bonnet through which the valve stem passes, a ring entering the upper end of the bonnet, a cap secured to said ring and around the valve stem, a collar for locking the cap and ring with the bonnet, an operating handle attached to the valve stem, a fixed stop on the cap in the path of the handle for arresting the movement of the handle.

2. In a mixing valve, the combination with a casing having inlet chambers and a mixing and outlet chamber connected with the inlet chambers by ports, valves adapted to open and close said ports, said valves connected with a valve stem, a bonnet through which the valve stem projects, a stuffing box around the valve stem in said bonnet, a ring entering the upper end of the bonnet, a clamping collar for connecting the ring to the bonnet, said ring carrying a stop pin, an operating handle attached to the valve stem, and a shoulder on the handle adapted to engage with said stop pin, whereby the movement of the handle is arrested.

3. In a mixing valve, the combination with a casing, a valve stem extending upward beyond the casing, a bonnet secured to the casing around said stem, a clamping collar having threaded connection with the upper end of said bonnet, a beveled ring entered into the upper end of the bonnet and engaged by said collar whereby the ring may be locked to the bonnet, said ring carrying a stop pin, an operating handle secured to the upper end of the stem and formed with a shoulder adapted to engage with said stop pin whereby the movement of the handle is limited.

4. In a mixing valve, the combination with the casing, of a bonnet secured to the casing, a valve stem extending through said bonnet, a stuffing box around said valve stem within said bonnet, a beveled ring adapted to be crowded into the outer end of said bonnet, a cap connected with said ring the said cap carrying a stop pin, a clamping collar surrounding the outer end of the bonnet and adapted to crowd the ring into the bonnet, an operating handle secured to the outer end of the valve stem and provided with a shoulder adapted to engage with said stop pin whereby the movement of the operating handle may be arrested.

5. A stop for mixing valves comprising a collar adapted to be screwed on a bonnet, and a stud-carrying member rotatably mounted on the said collar and adapted to be locked to the bonnet by said collar.

In testimony whereof, I have signed this specification in the presence of two subscribing witnesses.

WILLIAM G. NEWTON.

Witnesses:
T. S. COLEMAN,
E. A. WRIGHT.